United States Patent [19]

Rachesky

[11] Patent Number: 5,655,435
[45] Date of Patent: Aug. 12, 1997

[54] DECKTOP BARBECUE/CAMPFIRE UNIT

[76] Inventor: Stan Rachesky, 1686 Mitchell Creek Rd., Glenwood Springs, Colo. 81601

[21] Appl. No.: 615,980

[22] Filed: Mar. 14, 1996

[51] Int. Cl.⁶ .............................. A47J 37/00; A47J 37/07
[52] U.S. Cl. .................. 99/339; 99/400; 99/385; 99/449; 99/450; 99/421 H; 126/25 R; 126/9 R
[58] Field of Search .................. 99/339, 393, 400, 99/421 H, 448, 449, 450, 385; 126/25 R, 9 R, 30, 50, 214 A

[56] References Cited

U.S. PATENT DOCUMENTS

| | | | |
|---|---|---|---|
| 3,745,303 | 7/1973 | Epperson et al. | 99/450 |
| 4,759,276 | 7/1988 | Segroves | 99/339 |
| 4,788,905 | 12/1988 | Von Kohorn | 126/25 R |
| 5,033,448 | 7/1991 | Sandweg | 126/25 |
| 5,156,140 | 10/1992 | Zisman | 126/214 A |
| 5,168,796 | 12/1992 | Porton et al. | 126/25 R |
| 5,183,027 | 2/1993 | Saldana | 126/25 R |
| 5,279,214 | 1/1994 | Lamendola | 99/445 |

OTHER PUBLICATIONS

Portable Outdoor Fireplace (no date).
Fire rings built to burn natural gas (no date).
Latest Patio Range Delivers Warm Welcome; by Jack Cox, published Denver Post (no date).

*Primary Examiner*—Reginald Alexander
*Attorney, Agent, or Firm*—Rick Martin

[57] ABSTRACT

An outdoor patio deck is outfitted with a metal grate having a central fire bowl. The fire bowl can be used as a barbecue pit or a campfire retainer. The metal grate dissipates the heat from the fire and prevents damage to the deck. A cooking chamber is created by the addition of a pair of racks, a spit, and a lid. An ash chute can be installed at the bottom of the fire bowl for high decks.

19 Claims, 4 Drawing Sheets

DECKTOP BARBECUE/CAMPFIRE UNIT

CROSS REFERENCE PATENTS

This application is with design patent application Ser. No. 29/042,756 filed Aug. 16, 1995 pending.

FIELD OF INVENTION

The present invention relates to a deck-mounted barbecue pit that can also be used as a fire pit.

BACKGROUND OF THE INVENTION

The typical campfire used by man since before the dawn of recorded time consists of a perimeter of rocks. Within that perimeter is placed the fuel for the fire. People use campfires for cooking, protection against the elements and wildlife, roasting marshmallows, a source of warmth, and as a center around which people seat themselves and interact. Campfires provide a natural, possibly primal, outdoor social nucleus. Since most homeowners are not willing to create such campfires in their own backyards, they must travel to a park or other remote area that allows campfires. Camping entails planning, packing, and travel; all of which consumes much time and leaves less time for the actual camping experience.

As far as enjoying an outdoor fire while camping, the age-old campfire has a tremendous advantage over the existing waist-level cookers and barbecue units. The campfire is at floor level. Waist-level cookers do not provide the same social nucleus that the traditional campfire does. Campers do not seat themselves in a circle around an outdoor cooker. Smaller portable cookers, which may create fire near floor level, are not of sufficient size to approximate a campfire. Further, they are unable to cook much food due to their small size and are unable to produce enough heat to warm the social circle.

As stated, outdoor fire pits, grills, barbecues, and cookers, with the exception of the chiminaya and to a lesser extent the Weber® Fireplace (discussed below), are at a disadvantage to campfires in that their fires are not at floor level. Therefore, they do not approximate a campfire. But they do enjoy one important advantage over a campfire: they can be located at home on one's back patio, deck, or porch. A campfire, as noted above, is not easily created in one's backyard without creating an ashen pit where the grass used to be. It could not be safely created on a deck, patio, or porch due to the contact of the fire with the deck, patio, or porch.

Many such cookers of the outdoor variety are non-portable. The typical city park or Forest Service barbecue is a heavy metal box with a grill on top. The entire barbecue is mounted atop a metal pole stuck into the ground. It does not approximate a campfire since it is waist high. Other non-portable firepits found at campsites are floor level and made of stone, brick, or cement. They are installed in a dirt base because the potentially high temperatures created by the fire could crack or buckle cement. Home non-portable units (except the chiminaya, below) are unequivocally waist high.

Several portable barbecues exist for outdoor use. All are supported at their base by legs or similar extension which contact the supporting surface (a table, the ground, a deck, etc.) and raise the fire above the support surface. Some are designed to hang from the sides of balcony railing (U.S. Pat. No. 5,033,448 to Sandweg in 1991). Of all the outdoor cooking devices that exist, none are capable of a floor-level fire for use within a wooden deck. This is due to the likelihood that the floor surface could attain a temperature that results in ignition or damage to the wooden deck.

U.S. Pat. No. 5,279,214 to Lamendola (1994) discloses a heavy-duty cooking assembly made of masonry with waist-level cooking surface that when disassembled does not leave evidence of its existence. Since many heavy-duty outdoor barbecues are unsightly, removal leaves scarred cement or brick remnants. Although it bridges many of the gaps between portable and non-portable outdoor cookers, it too has a cooking surface at waist level and admits of the unsightliness of the usual bulky, outdoor non-portable cooker. As such, homeowners often attempt to dismantle these cookers before selling a home and moving. This creates an unsightly scar where the cooker was installed.

The chiminaya is essentially a clay bowl. It is a centuries-old Mexican, outdoor clay fire pit that can be installed in a homeowner's yard or patio. With a chiminaya, a homeowner can enjoy a fire at floor level. To install the chiminaya, the homeowner digs a bowl-shaped hole to match the shape of the chiminaya or creates such a hole in a patio. He then lowers the chiminaya into the hole. It adds attractive ambiance to a home. However, since it is made of clay, it is susceptible to cracking at higher temperatures. Homeowners unsuccessfully use propane fire rings for a heat source, but these rings are not in direct contact with the clay. One supplier of different versions of the chiminayas cautions against using charcoal, lighter fluid, or Dura-Flame®-type logs because the high heat produced might crack the clay. Moreover, since the chiminaya comes into direct contact with the support surface of the patio, the support surface is at the mercy of the temperatures transferred through the clay. When it was created centuries ago, the chiminaya was intended to be set into the earth. If the chiminaya is installed in a cement patio, high temperatures in the chiminaya may crack or buckle the cement.

Other relevant prior art includes the Weber® Fireplace. It is essentially a shallow bowl supported by four very short legs and comes with a lid. The bowl has a rack inside it to support fireplace logs. The purpose of the Weber® Fireplace is to allow users to enjoy the ambiance of a fireplace outdoors. The disadvantage of the fireplace is that it may not be safely used in combination with a wooden deck due to the close proximity of the base of the shallow bowl with the floor. The Weber® Kettle Company even sells a hot pad upon which the Weber® Fireplace may rest to protect the underlying wooden deck from damage due to the high heat produced by the Weber® Fireplace. Moreover, the Weber® Fireplace may not be used as a barbecue since there is no cooking rack employed above the fire source. Further, the Weber® Fireplace only allows a fire to be created above floor level. This does not approximate a campfire.

The present invention solves the problem of enjoying both a barbecue cooker and a campfire on a wooden deck. A large metal grate is installed in the deck to diffuse the heat from a centrally located metal fireplace.

SUMMARY OF THE INVENTION

The main object of the present invention is to provide a floor level barbecue unit which very closely approximates a campfire.

Another object of the present invention is to provide a barbecue unit that may safely be used in an outdoor patio or deck.

Another object of the present invention is to provide a barbecue unit capable of cooking large amounts of food.

Another object of the present invention is to provide a barbecue unit which will greatly enhance the ambiance of the patio or deck in which it is installed.

Another object of the present invention is to provide a cooking chamber that, when combined with a metal grating, will produce a barbecue capable of hot, blazing fires with no danger to surrounding support surfaces.

Another object of the present invention is to provide a floor-level cooking chamber that will not crack at high temperatures.

Another object of the present invention is to provide a floor-level cooking chamber with the flexibility to use any type of fuel normally used in campfires, barbecue units, fire pits, outdoor grills, and outdoor cookers; and to do so safely in a wooden or other type of deck or patio.

Another object of the present invention is to provide an outdoor cooker capable of withstanding exposure to the elements without significant deterioration.

Another object of the present invention is to provide an outdoor cooking chamber of varied material composition, color, shape, and size; and sheet material of varied material composition, color, shape, and size, to compliment the style of the patio or deck into which it is installed.

Another object of the present invention is to provide a barbecue assembly, approximating a campfire, on the comfort of one's own property.

Another object of the present invention is to provide an assembly which may be installed and removed by a person with average skill and to provide a barbecue unit with a funneled ash drop and receptacle ash collector.

Other objects of this invention will appear from the following description and appended claims, reference being made to the accompanying drawings forming a part of this specification wherein like reference characters designate corresponding parts in the several views.

The preferred embodiment of the present invention consists of a metal grate perhaps six feet in diameter. Shapes include rectangular, square, circular, and octagonal. The grate is mounted at surface level in a wooden deck. In the center of the metal grate is a fire chamber having a circular, vertical retaining wall. A portion of the fire bowl extends below the metal grate. It can burn wood, charcoal, propane, or natural gas. A cooking grill is provided. Optionally an ash funnel can be installed to accept ashes from the fire bowl. The deck is protected from the fire's heat by the distance of the fire from the deck. The deck is protected from heat due to the heat dissipation of the metal grate and the installation of a galvanized metal heat shield around the periphery of the grate.

The manner of installation of the decktop barbecue/campfire unit is straightforward. A hole is cut into the deck or patio in any shape desired. The usual diameter of the hole is six square feet, but it can vary dramatically depending upon the custom design of the unit. Galvanized metal strips are installed as a heat reflector. These strips are approximately 10 feel long and eight inches wide. Next, the sheet material (grating) is lowered into the deck or patio and fixed into position. The fire bowl is then lowered or placed into the hole created in the sheet material and held in place by the metal flange attached to the outer wall of the cooking fire bowl. The fire bowl may come with an optional ash drop cone-shaped hopper which requires installation of an ash collector beneath the ash drop.

The operation of the cooking chamber is in the same manner as any outdoor cooker. Generally, the interior of the cooking chamber comes with two support racks. The bottom rack supports the fuel (wood, charcoal, etc.) and the upper rack supports the food. A bottom rack is not included in models in which natural gas, propane, or other forced fuel is used. Upon proper ignition of the fuel, food may be placed upon the upper rack and cooked as desired. To enjoy the decktop barbecue/campfire unit as a campfire only; the upper rack is removed and fuel such as fireplace logs are placed in such a manner as to create a larger and hotter fire than is used for cooking food.

Each unit comes with a lid which covers the top of the fire bowl. Each lid is designed to completely cover the fire created within the fire bowl; thus reducing, but not eliminating, the flames created by combusting fuel. The lids are always fully removable.

A sheet material, of which one example is metal grating, encircles the fire bowl and attaches the fire bowl to an outdoor deck. The sheet material acts as a heat buffer and dissipater. The sheet material substitutes for the part of the deck that immediately surrounds the fire bowl, and it is capable of supporting at least as much weight as the deck that it replaced. If installed properly, it is safe for supporting people and the cooker. As a result of this sheet material being combined with the fire bowl, owners of wooden decks or cement patios can now safely cook over a campfire located right in their own backyard. All the amenities of home (refrigerator, television, bathroom, bed) are located only on the other end of the deck where the entrance to the home is. The aesthetic effect of the present invention further enhances the value of the homeowners realty. No time is wasted planning, packing, or traveling to a campsite.

Although capable of disassembly, the present invention adds immensely to the overall attractiveness and aesthetic appearance of its outdoor location. As such, a homeowner selling his property would probably leave the present invention in place as one of the fixtures. Its floor level design blends well with the appearance of the deck upon which it is docked, and it is certain to make the overall value of the realty increase. Further, the cooking surface of the present invention is not the traditional waist level, but instead is floor level which most closely approximates the level of a campfire. When used as an outdoor campfire, the decktop barbecue/campfire unit can be appreciated from all sides and may be looked down upon by the "campers" as they are seated around it. The waist-high level of other barbecues does not lend itself to such enjoyment.

The aforementioned flat sheet material, one example of which is a metal grate, acts as a heat buffer and dissipater between the cooking chamber and the deck or patio. Therefore, whereas it is possible that the high heat produced by a floor-level cooker, such as the chiminaya, or a heat source very near the floor surface, such as the Weber® Fireplace, may crack a cement patio or burn a wooden deck, into or upon which it is installed or rests, the sheet material of the present invention, acting as a heat buffer and dissipater, prevents just such unwanted effects. Further, the chiminaya is made of clay and susceptible to cracking at high temperatures which can be created by Dura-Flame® logs, lighter fluid, etc. The material of the present invention, one example of which is steel, has no such limitations. Any combustible material or method which is normally used in campfires, fireplaces, or barbecues may be used in the present invention. This includes, but is not limited to, lighter fluid as an ignition aid, Dura-Flame® or like logs, or scrap wood or charcoal used as fuel, or forced fuel hookups such as propane or natural gas used as fuel.

Although the description above contains many specifications, these should not be construed as limiting the scope of the invention but as merely providing illustrations of some of the presently preferred embodiments of this invention. For example, the sheet material can have several shapes and compositions, as may the cooking chamber. The entire invention may be installed into a variety of outdoor floorings, not limited to decks or patios.

Thus the scope of the invention should be determined by the appended claims and their legal equivalents, rather than by the examples given.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
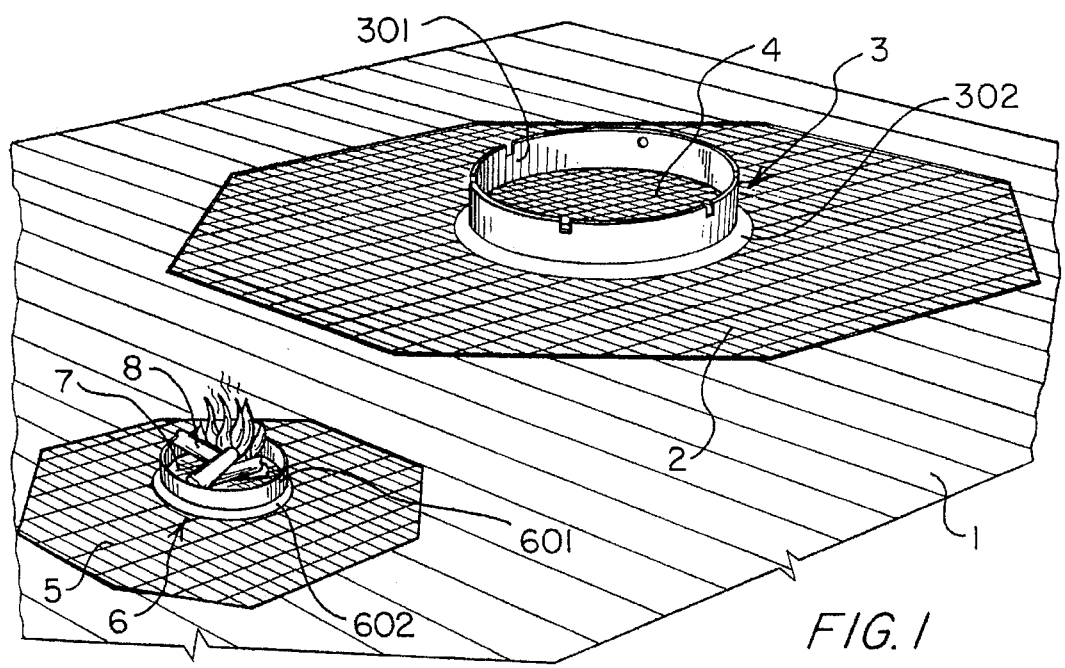
FIG. 1 is a top perspective view of a large and a small embodiment of the decktop barbecue/campfire unit.
Figure 2:
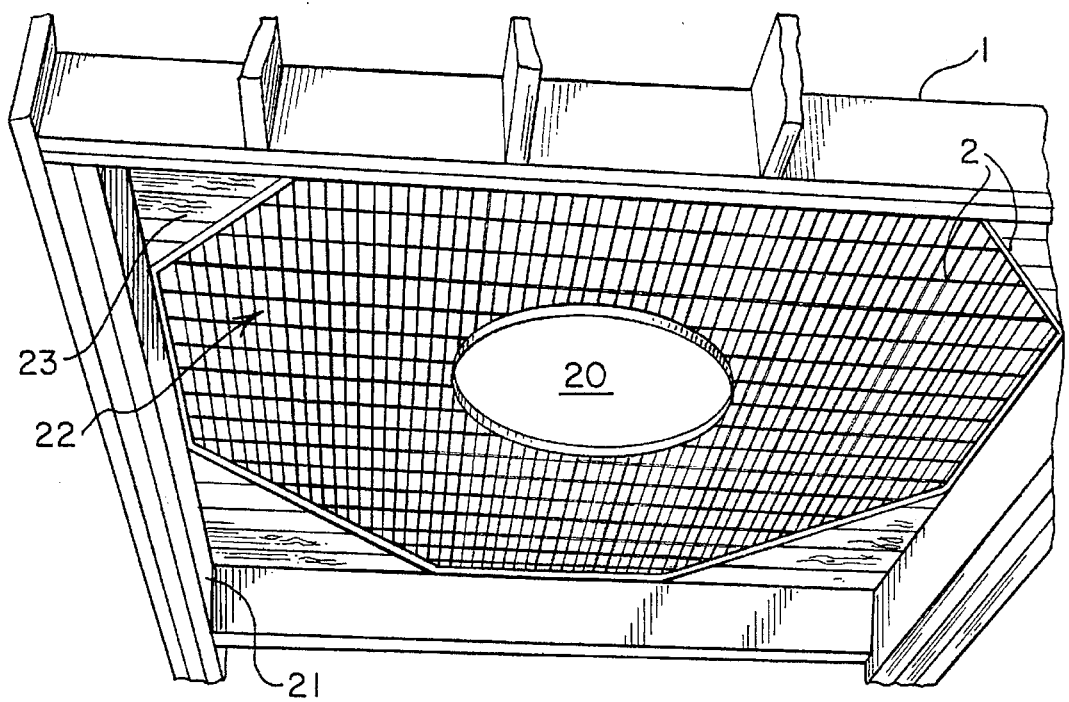
FIG. 2 is a bottom perspective view of the large unit of FIG. 1 without the fire bowl.

Referring first to FIGS. 1, 2 a deck 1 has been outfitted with a large decktop barbecue/campfire assembly 2, 3, 4, and a small decktop barbecue/campfire assembly 5, 6, 7. Members 2 and 5 are metal grates. Members 3 and 6 are fire bowls. Member 4 is an upper rack, and member 7 is a lower rack. Flanges 302 and 602 support the fire bowls in a hole in the grate. A fire 8 is burning on the lower rack 7 inside the fire bowl 6. The portion of the fire bowl 301 and 601 is viewed above the deck. The fire bowl 6 has a retaining wall 601 protruding above the deck. They are defined herein as retaining walls. The fire bowl 3 can also be seen in FIG. 3 below the deck level.

Figure 3:
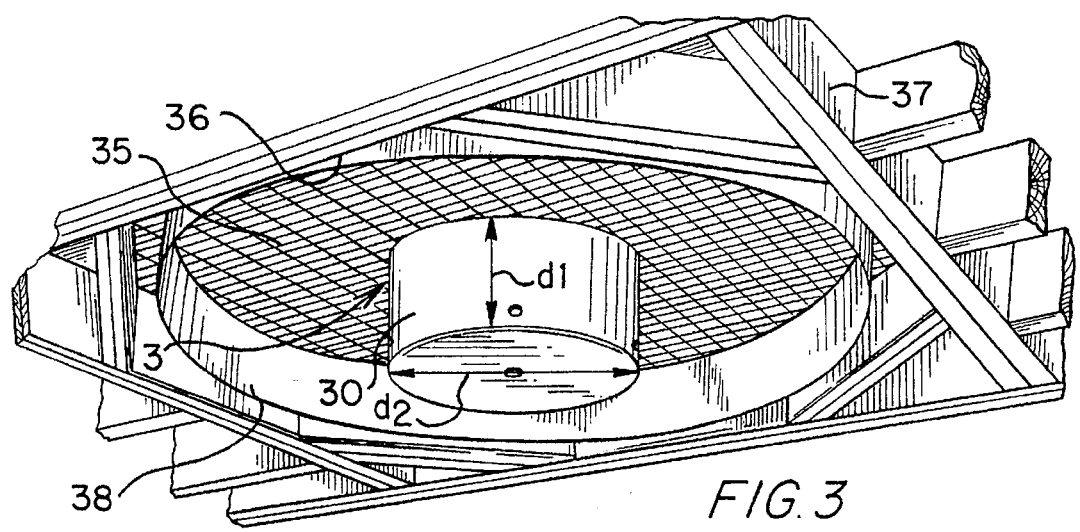
FIG. 3 is a bottom perspective view of a round embodiment having a perimeter heat shield.

In FIG. 3 the fire bowl 3 has been installed in an octagonal grate 35. The fire bowl 3 further consists of a bowl 30 depending below the grate 35.

FIG. 2 shows the preferred construction technique of mounting the metal grate 2 in deck 1. The hole 20 supports the fire bowl 3 by means of the flange 302 extending from the side of the fire bowl 3. A hole 22 is cut or built into the deck 1. Deck panels 23 fit around the grate 2. The nominal diameter of grate 1 is six feet, and the diameter of hole 20 is two feet.

Referring again to FIG. 3 the grate 35 is octagonal. It is installed in a square hole 36 of deck 37. Nominal dimensions are $d_1=12$ inches and $d_2=24$ inches. A heat shield 38 has been installed around the grate 35 to reflect the heat from fire bowl 3 from reaching the deck 37. There is approximately a 1½-inch space between the heat shield and the wooden structure of the deck.

Figure 4:
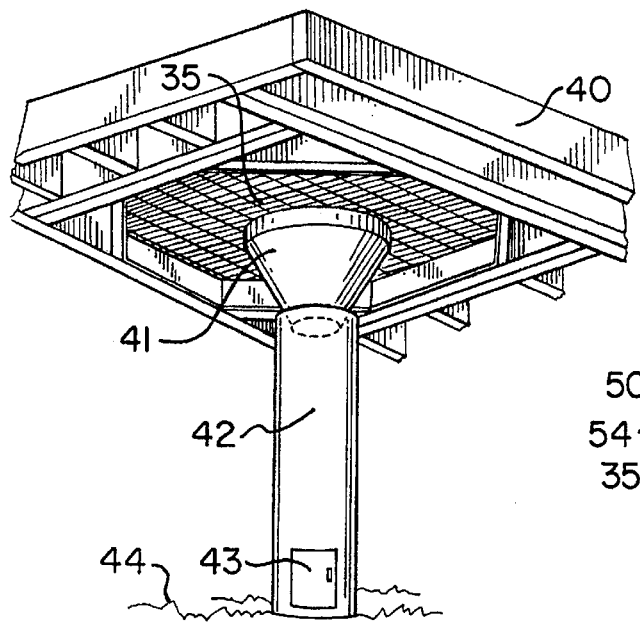
FIG. 4 is a bottom perspective view of the embodiment of FIG. 3 having an optional cone or hopper into which the ashes are funneled into an ash collecting tube. This is usually only installed in decks four feet above the ground or higher as it would not be convenient to clean out the tube in decks closer to the ground.

Referring next to FIG. 4 a raised deck 40 has a grate 35. A fire bowl 41 is tapered to permit the ashes to funnel into an ash chute 42 which extends to the ground 44. A clean-out access door 43 allows the ashes to be periodically removed from the chute 42. It is a design choice to build the ash chute 42 as a separate non-connected member as shown.

Figure 5:
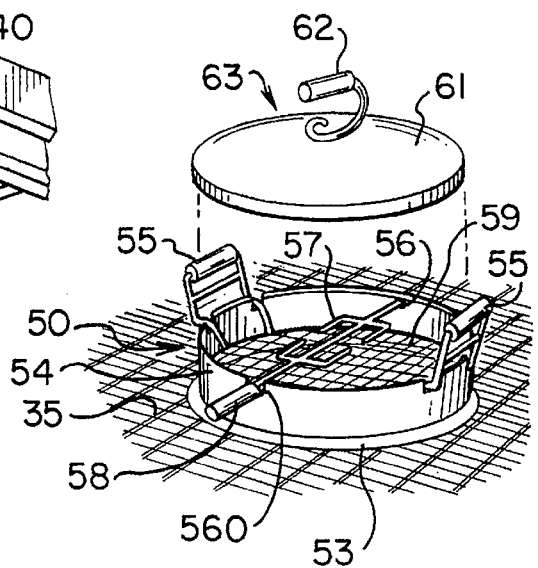
FIG. 5 is a top perspective close-up view of a cooking chamber and lid.
Figure 6:
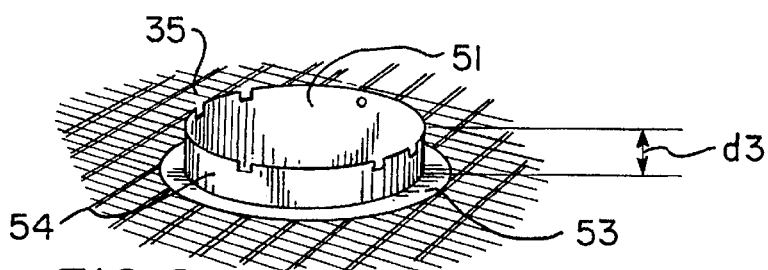
FIG. 6 is a top perspective view of a fire bowl.

Referring next to FIGS. 5, 6 the flange 53 supports the fire bowl 51. It also has a slot 560 and a hole 56 to support a spit 57 which has a handle 58. An upper rack 59 which has handles 55 is used to cook food. A lower rack 60 is used to support a cooking fire. Campfires are made by removing the upper rack 59. A lid 61 has a handle 62. The assembly 54, 55, 56, 57, 58, 59, 61, 62 creates a cooking chamber 63. When the lid 61 the upper rack 59, and the spit 57 are removed, a campfire can be made in the fire bowl 53.

Figure 7:
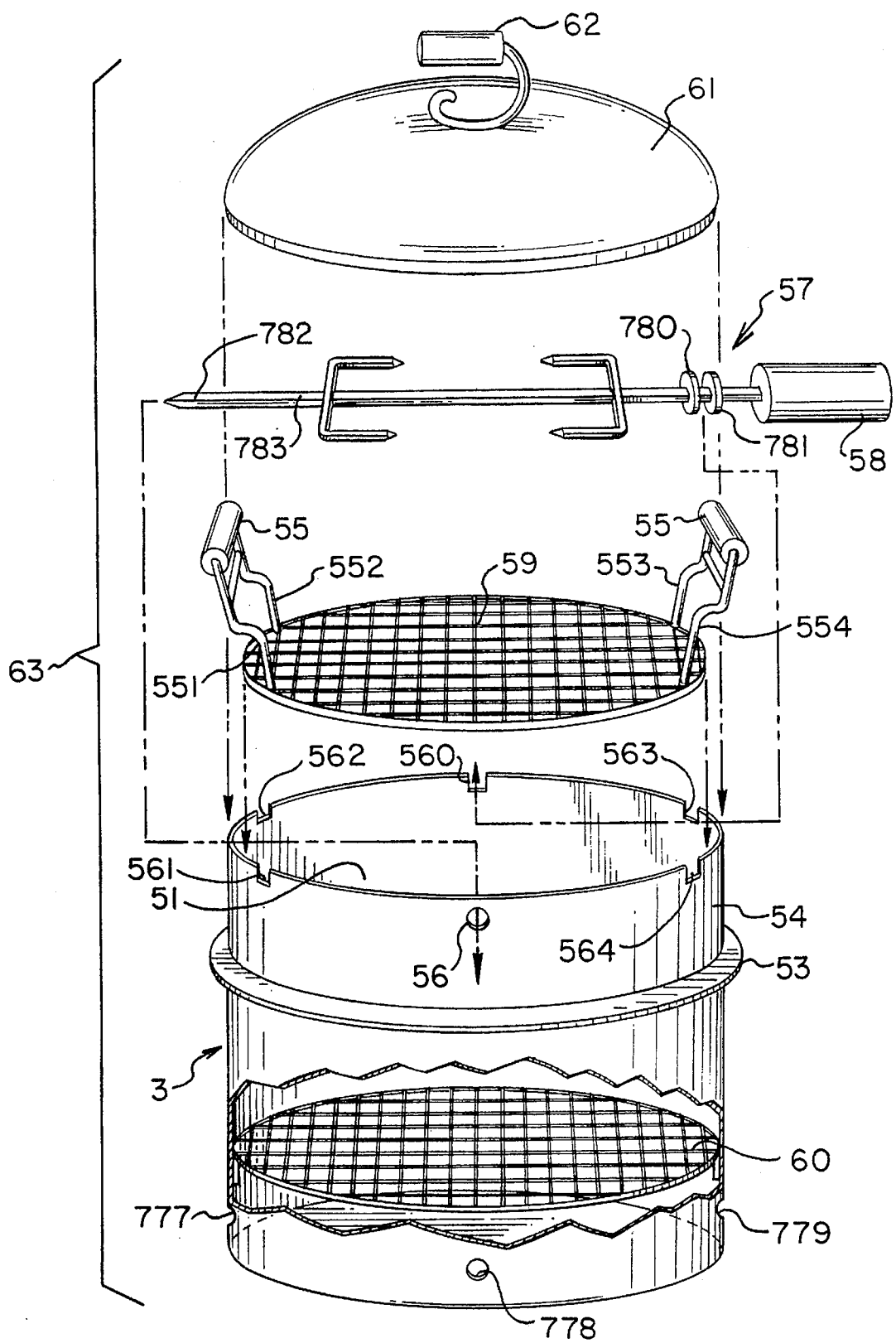
FIG. 7 is an exploded view of the fire bowl and cooking chamber assembly.

Referring next to FIG. 7 the flange 53 can be welded at any desired level on the fire bowl 3 to provide a desired height for the retainer wall member 54 above the deck. Air vents 777, 778 and 779 provide air to a fire (not shown) on the lower rack 60.

The handle rods 551, 552, 553, 554 rest in slots 561, 562, 563, 564. The spit 57 is preferably made of a ⅜-inch or ¼ inch square bar having planar portions 783. The planar portions 783 rest in slot 560. The user can turn the spit 57 in one-quarter turn increments for cooking. Tip 782 is supported in hole 56. Flanges 780, 781 prevent the spit 57 from falling.

Figure 8:
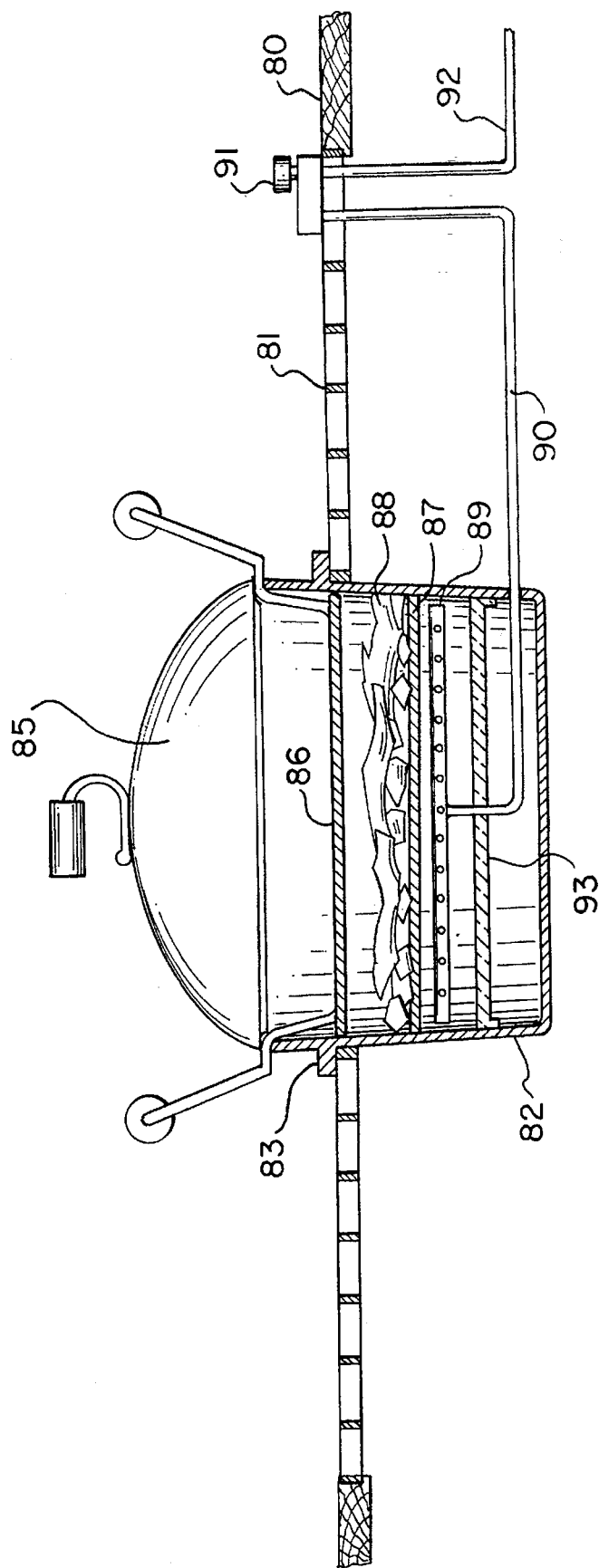
FIG. 8 is a sectional view of a gas fired embodiment of a cooking chamber.

Referring last to FIG. 8 a gas-fired embodiment is shown. A deck 80 has a grate 81. A fire bowl 82 is supported by flange 83. A lid 85 may be placed on fire bowl 82. An upper rack 86 supports food. Heat sink rocks 88 are supported on rack 87. Burner 89 is supplied with gas via tube 90 and control valve 91. A gas supply line 92 is connected to a fuel source (not shown).

One skilled in the art can see that the teachings herein could install an equivalent device in a cement patio or floor or in a wooden floor.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A campfire and grill assembly comprising:
   a grate having a mounting means functioning to mount the grate substantially flush with a deck;
   a hole in a central potion of the grate;
   a fire bowl removably engaged in the hole functioning to restrain a fire by means of a retaining wall; and
   said fire bowl further comprising a cooking chamber.

2. The assembly of claim 1, wherein the mounting means further comprises a hole in the deck and a support beam in the deck.

3. The assembly of claim 1, wherein the fire bowl further comprises a side wall having a flange to provide a support means in the hole.

4. The assembly of claim 1, wherein the fire bowl further comprises a fire retaining wall extending upward from the deck.

5. The assembly of claim 4, wherein the fire bowl further comprises a lower rack for supporting a fire and an upper rack for supporting food to cook.

6. The assembly of claim 5, wherein the fire bowl further comprises a lid functioning to create a cooking chamber.

7. The assembly of claim 1, wherein the fire bowl further comprises an ash removal means functioning to remove ashes from the fire bowl.

8. The assembly of claim 7, wherein the ash removal means further comprises a chute under the fire bowl.

9. The assembly of claim 1, wherein the fire bowl further comprises a gas burner.

10. The assembly of claim 5, wherein the cooking chamber further comprises a spit mounted in the fire-retaining wall.

11. The assembly of claim 5, wherein the cooking chamber further comprises an upper rack to hold food.

12. The assembly of claim 1 further comprising a heat shield depending from the grate and surrounding a periphery of the grate.

13. In combination with a deck having a mounting hole, an improvement comprising:

a sheet mounted in the hole;

said sheet having a central mounting hole; and a fire bowl functioning to contain a fire having a support means functioning to suspend the fire bowl from the central mounting hole; and said sheet further comprises a grate.

14. The improvement of claim 13, wherein the support means further comprises a flange around a side wall of the fire bowl.

15. The improvement of claim 13, wherein the fire bowl further comprises a cooking chamber.

16. The improvement of claim 15, wherein the fire bowl further comprises a lower rack for supporting a fire, an upper rack for supporting food to cook, a lid, and a spit.

17. The improvement of claim 16, wherein the fire bowl further comprises an ash removal means functioning to remove ashes.

18. The improvement of claim 17, wherein the ash removal means further comprises a chute under the fire bowl.

19. The improvement of claim 15, wherein the cooking chamber further comprises a gas burner functioning to heat the cooking chamber.

* * * * *